Sept. 14, 1926.
F. W. MOORE
1,599,973
LEATHER STRUCTURE AND METHOD OF MAKING THE SAME
Filed Dec. 19, 1923. 3 Sheets-Sheet 1
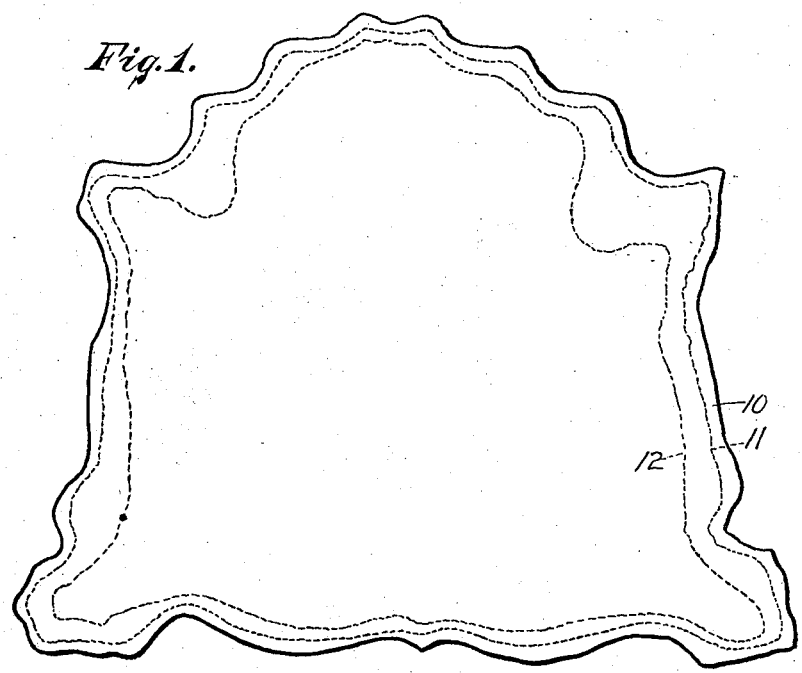
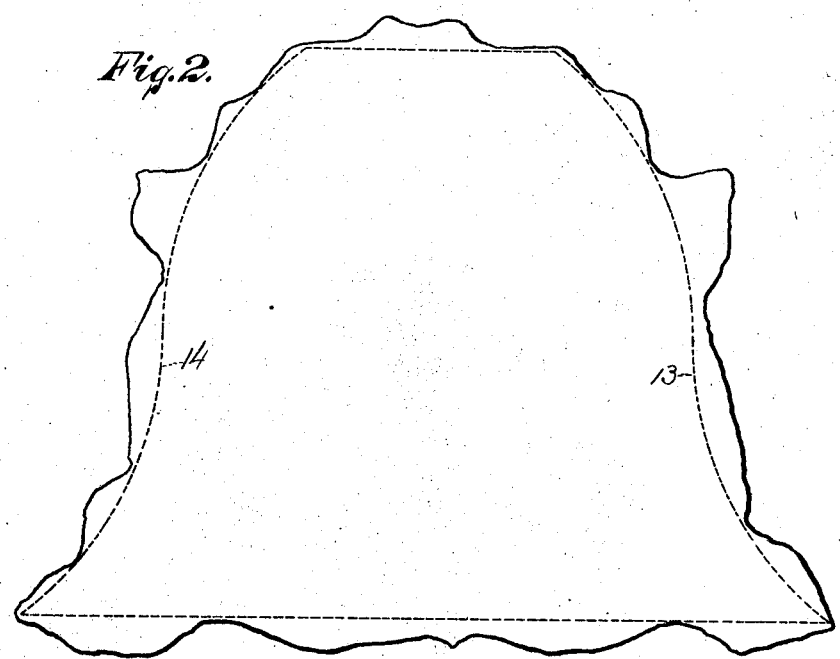
INVENTOR
Frederick W. Moore
BY
Arthur B Jenkins,
ATTORNEY Sept. 14, 1926.
F. W. MOORE
1,599,973
LEATHER STRUCTURE AND METHOD OF MAKING THE SAME
Filed Dec. 19, 1923   3 Sheets-Sheet 3
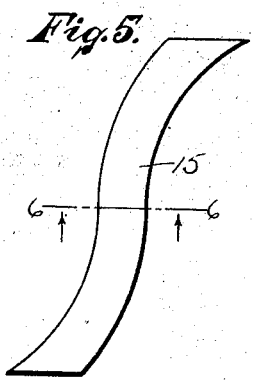
Fig. 5.
Fig. 6.
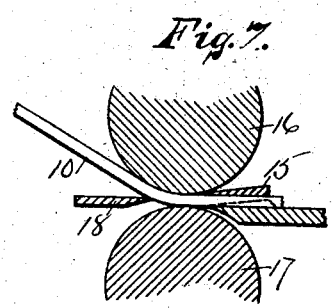
Fig. 7.
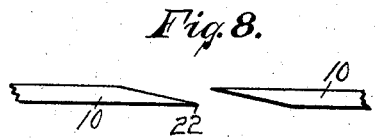
Fig. 8.
Fig. 9.
Fig. 10.
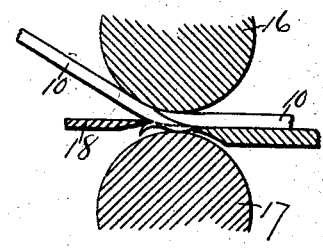
Fig. 11.
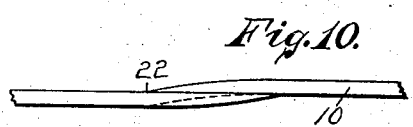
Fig. 13.
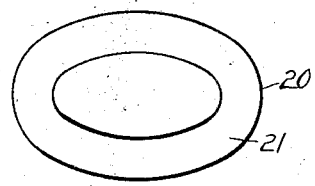
Fig. 12.
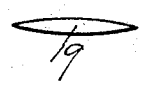
Fig. 14.
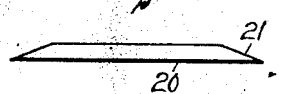
INVENTOR:
Frederick W. Moore,
BY Arthur B. Jenkins,
ATTORNEY.

Patented Sept. 14, 1926.

1,599,973

UNITED STATES PATENT OFFICE.

FREDERICK W. MOORE, OF EAST ORANGE, NEW JERSEY.

LEATHER STRUCTURE AND METHOD OF MAKING THE SAME.

Application filed December 19, 1923. Serial No. 681,488.

My invention relates to leather structures comprising a plurality of hides or skins in original or lesser areas joined to comprise pieces of larger areas, and an object of my invention, among others, is an arrangement of such leather structures with the edges beveled and secured together so that the opposite side edges of the strips thus formed may be "squared" that is, they may be trimmed off on straight lines parallel each to the other and to a line passing centrally through the strip for its entire length, thereby reducing the waste to a minimum; and a further object of the invention is an arrangement of the leather structures in the manner above described and with the joined edges more or less evenly overlapped to preserve a maximum amount of area. A further object of the invention is the production of a joint between the several sections of a strip, which joints shall be effectively concealed and shall be also remarkably strong and durable. A further and general object of the invention is the production of such leather structures, as in strips whereby they may be rolled, in a manner to avoid waste in cutting and trimming, as compared with old methods of cutting up single hides or splits for the production of articles of various sorts; and a still further object of the invention is to facilitate the cutting and finishing of the strips by machinery at a material saving over the handling of individual hides or splits.

My improved leather structure and its method of formation, in the making and use of which the objects herein set out, as well as others may be attained, is illustrated in the accompanying drawings in which—

Figure 1 is a face view of a hide showing in dotted outline the shapes and sizes of splits that are commonly produced from a hide or skin.

Figure 2 is a face view of one of the splits or hides of a skin, showing in dotted outline the shape of a trimmed piece produced from such hide or skin in a manner to conform a plurality of such pieces one to another so that when joined at their side edges the sides of the strip thus produced will be straight and generally parallel each to the other and to a straight line passing centrally through the strip from end to end.

Figure 5 is a perspective view of a pattern used in beveling the edges of the hides or skins.

Figure 6 is a view in cross section through said pattern.

Figure 7 is a view in cross section through the feed rolls, table and knife of a splitting machine illustrating the beveling operation.

Figure 8 is a detail edge view of the beveled edges of two adjoining pieces of leather.

Figure 9 is a detail view showing the manner of disposing said pieces to provide overlapped edges.

Figure 10 is a view of the same pieces showing the overlapped portions upon the faces of the leather pieces.

Figure 11 is a view similar to Figure 7, but showing the trimming operation to level the hide at the joint.

Figure 12 is an edge view of the piece removed in this trimming operation.

Figure 13 is a face view of a hole shaping pattern.

Figure 14 is an edge view of the same.

In the practice of my invention, as disclosed herein, in addition to the advantages gained in such arrangement of the hides or skins as to effect an immense saving of material I also overcome and avoid objections heretofore existing, this by conforming the meeting edges one to the other and by accurately shaping and overlapping the pieces to be joined so that when subsequently leveled the knife employed for this purpose will act upon the joint to reduce its prominence to a minimum and to such degree as to render it invisible after subsequent operations required to place the strip in its final and finished condition.

Hides or skins as prepared for use for the production of various articles are substantially in the form and shape as when taken from the animal, such hides or skins being cured in this shape. As thus prepared they are of irregular shape and commonly narrower at one end than at the other, the head or neck end usually being the narrowest. Owing to this irregular shape much waste has heretofore taken place in cutting the hides up for the production of articles of manufacture, and much more waste has taken place in such cutting in order to secure the better and more durable parts of the hides. In the practice of my invention I so arrange the hides or skins relatively one to another that when joined the strip thus produced will be "squared" up and the hides or skins are joined at the weaker portions which are overlapped thereby imparting strength and substance to such weaker portions to compare with the naturally better portions of the skin and thereby enable such weaker portions to be made use of.

It will, therefore, be perceived that my invention not only enables portions of hides or skins that would otherwise be discarded for certain reasons to be made use of, but it also produces large areas of leather in the manner herein set out whereby substantially all of the material may be used, as the strips may be produced in such widths and lengths to meet special requirements as to enable them to be cut to special sizes without waste.

Figure 4:
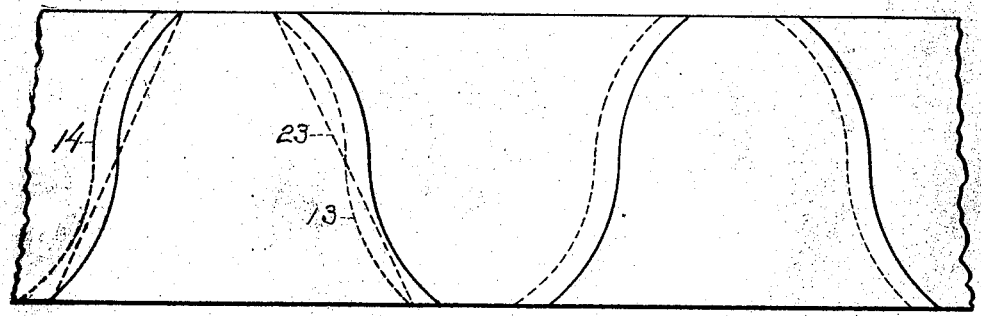
Figure 4 is a face view of a short length of a strip formed by joining many hides or skins in accordance with my invention.

In order to convey a clear understanding of my present invention I have shown in Figure 1 of the drawings a hide or skin having the same general shape as when taken from the animal. For subsequent use in manufacture such hides or skins 10 are commonly split into at least three pieces, such splits being of different sizes, as shown by the dotted lines 11—12 in said Figure 1. In Figure 2 of the drawings I have graphically illustrated the shape that may be given to a hide so that little waste will take place in trimming and in doing this the edges are cut on the dotted lines 13—14 and on regular reverse curves. I have found from extended experiment that by far the greater portions of hides or skins may be thus formed, but if it shall be found that there is a difference in sizes of some skins judicious sizing will produce the required results. It will be noted that the edges to be joined of the trimmed hide or skin, as denoted by the dotted lines 13—14 are reversely curved, each of the curves being of the same radius, so that two hides when arranged in reversed position will conform each to the other, thereby enabling an evenly overlapped joint to be produced, as shown in Figure 4 of the drawings. In some instances straight lines may be substituted for curves.

Hides or skins, in the condition in which they are prepared for manufacture are susceptible to more or less stretching and this will enable them to be stretched to some extent so that the final shape desired may be obtained and the edges will fall within the boundaries desired.

Figure 3:
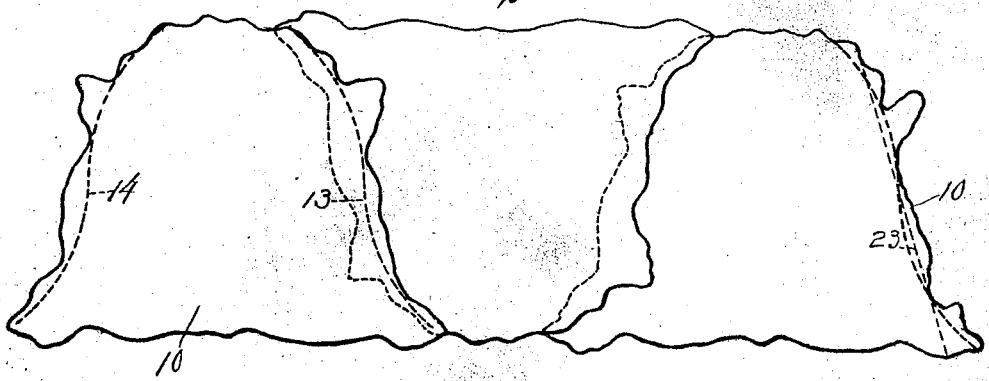
Figure 3 is a face view of several hides or skins joined at their side edges, which edges are, however, shown as untrimmed, the dotted lines showing the overlapped portions. In this view the hides or skins are arranged so that opposite side edges may be trimmed to "square" such edges as hereinbefore described.

While I prefer to trim the adjoining edges of the hides or skins to a more or less regular shape, as shown in Figures 2 and 4 of the drawings, it will be within the intent and scope of my invention if such trimming be omitted, the hides, however, being arranged with a narrow end placed opposite a wide end to conform them one to another, and as shown in Figure 3 of the drawings.

In order to provide a joint that shall be imperceptible in the finished strip, the adjoining edges, whether trimmed to regular shape or not, are beveled, and these two beveled meeting surfaces should accurately fit one another. To effect this purpose I make use of a beveling pattern 15, as shown in Figures 5 and 6, which pattern is beveled to the same degree as that desired to be imparted to the edge of the leather piece. I also make use of a leather splitting machine of common construction and comprising rolls 16—17 between which the hide or skin 10 with the pattern placed thereon at the point to be beveled, is passed, and as shown in Figure 7 of the drawings, to the action of a cutting knife 18, in a manner that will be readily understood by those skilled in the art and for which reason only the rolls, knife and table of the splitting machine have been shown herein. In this operation the leather is positioned and arranged by the shape of the pattern 15 to so conform to the knife 18 that the latter will cut through the leather in a diagonal path to produce the bevel, the leather assuming its normal condition with a finely beveled and feathered edge 22 after the release of the pressure caused by the pattern and rolls. All of the pieces are, therefore, cut to the same pattern and consequently will accurately fit each other.

The several pieces to be joined in a strip are secured by a suitable adhesive, one to another, at their beveled edges, and in doing this I overlap the extreme feather edge of one piece upon the flat unbeveled surface of the other piece, that is, such extreme feather edge is extended beyond the beveled surface, and as shown in Figure 9 of the drawings. The two pieces are then caused to firmly adhere to the extreme of the feathered edge, and as shown in Figure 10 of the drawings, and it will now be noted that the resultant strip is thicker at such overlapped parts than at other parts which are of substantially uniform thickness.

After enough of the hides or skins have been thus joined to produce a strip of the required length, such strip is again passed through between the rolls of the splitting machine and subjected to the cutting action of the knife, as shown in Figure 11 of the drawings, and in a manner that will be readily understood, the beveled pattern not now being used, but the strip being shaved as to the thicker and overlapped parts of the joint to make the entire strip of uniform thickness. The pieces thus removed will be of substantially the shape shown in Figure 12, in which the numeral 19 designates such removed piece.

In this leveling operation the strip is moved in a direction to cause the knife to penetrate the leather at a point behind the feathered edge on that side of the strip being leveled, the knife passing out from the surface of the leather at or in close proximity to the feathered edge, and this action of the knife upon the joint at this part aids to make such joint imperceptible.

It frequently occurs that hides or skins possess scars or other undesirable spots or portions produced during the lifetime of the animal, or in the operation of removing the skin from the animal, and I make use of my invention herein set forth in the operation of patching such spots. In doing this I provide a patching pattern 20 preferably somewhat larger than the surface to be patched and that may be of any desirable material and of suitable shape, preferably oval, and as shown in Figures 13 and 14 of the drawings. This pattern has a beveled surface 21 terminating in a thin feathered edge, as hereinbefore described, with respect to the pattern 15.

This pattern is placed over the spot or portion to be patched and the piece of leather and the pattern are passed between the rollers as hereinbefore described, with a result that a hole of the shape of the pattern and with a beveled feathered edge will be produced. The same pattern, or one slightly larger, is used in the same way to cut another piece from another piece of leather, which piece will be of exactly the same shape as the hole first cut as above described, and this piece is then placed within said hole, after being treated with a suitable adherent and it will be found to accurately fit said hole, with a result that the piece will be secured in place in a manner to effectually conceal the patched spot, and this especially after the surface has been leveled as hereinbefore described and finishes have been applied.

Hides or skins in their natural condition are generally thinner at the neck or shoulder portions than at the opposite or butt portions, and in producing a strip by placing a neck portion opposite a butt portion the thickness of the strip at the joined portions is maintained more uniform than would be the case in which a thick portion overlapped a thick portion at one side of the strip, or a thinner portion overlapped another thin portion at the opposite side of the strip.

In cases where only small holes or scars occur in the hide or skin the beveled patch of leather is placed over the scar or hole on the back or opposite side and then the whole strip or roll of hides are passed through the splitting machine and the face side of the scars or holes are beveled to the patch which has been applied to the opposite side and thus all unevenness of the scar or hole is removed from the face or finished side of the roll of leather.

As hereinbefore mentioned in place of the reversed curved lines straight lines may be so formed that the two hides when arranged in reversed position will conform each to the other, such straight lines being denoted by the numeral 23.

In accordance with the provisions of the patent statutes I have described the principles of operation of my invention, together with the material which I now consider to represent the best embodiment thereof; but I desire to have it understood that the material shown is only illustrative and that the invention may be carried out by other means and applied to uses other than those above set out.

I claim—

1. As a new article of manufacture a plurality of pieces comprising hides or sides of leather generally of less width at one end than at the other, said pieces being placed with their side edges adjoining and with the narrow end of one piece opposite the wide end of an adjoining piece to produce a straight strip, said adjoining edges being beveled and overlapped and joined by the use of an adhesive to produce of the edges a strong joint, the strip being of substantially uniform thickness throughout its length.

2. As a new article of manufacture, a plurality of hides or skins or major segments thereof joined into one larger area of leather having joints formed of lapped beveled corresponding extremities of the natural hide or skin that dissemble to give the appearance and utility when finished of one piece of natural leather, the strip being of substantially uniform thickness throughout its length.

3. The method of joining irregular shaped pieces of material that consists in beveling the edges to be joined to exactly mate one with another, then applying an adhesive to the beveled edges, then pressing said edges into close contact, and then removing portions of the surface covering the joint to produce material of substantially uniform thickness.

4. The process of joining pieces of material that consists in beveling the edges of two pieces of hides to be joined, then overlapping the beveled edge of one piece beyond the bevel and on to the flat surface of the other piece, then securing said pieces together, and then cutting the joined piece thru said joint with a cut parallel to one surface to make it of uniform thickness with the rest of the piece.

5. The process of joining pieces of material that consists in cutting a plurality of hides or skins to substantially the same shape, each of said pieces having the largest area of that shape that may be produced from the skin, then beveling the edges of said pieces to the same shape, and then disposing said pieces to form a straight strip and joining the beveled edges by an adhesive to form a strong joint and then cutting away portions at said joints to make them of uniform thickness with the rest of the strip.

6. The method of joining pieces formed from natural hides or skins narrower at one end than at the other end consisting in cutting opposite edges of each hide or skin on reverse curves of the same radius, beveling the edges thus shaped to conform one to another, then arranging the pieces with a wider end opposite a narrower end to produce a straight strip, and then joining said beveled edges by the use of an adhesive to form a strong joint.

7. The method of joining pieces of material consisting in applying a bevelling pattern to one edge of the material to be movable therewith, then forming a bevelled edge on the material corresponding to the pattern, mating corresponding bevelled edges of the pieces of material, applying an adhesive to the bevelled edges, pressing said edges into intimate contact and then removing excess portions of material at the joined edges to present joined materials of equal thickness throughout their lengths.

8. The treatment of hides that consists of shaping the same by stretching said hides to conform one hide to another with least waste, cropping off the poor edges to approximate natural contour, beveling the edges of the shaped sides, then joining one hide to another to form of a plurality of hides one larger squared area, and then cutting away portions of the joints to reduce them to a thickness substantially equal to the remaining portions of the hides.

FREDERICK W. MOORE.